US008645578B2

(12) United States Patent
Eldar (10) Patent No.: US 8,645,578 B2
(45) Date of Patent: Feb. 4, 2014

(54) ROUTING OF MESSAGES

(75) Inventor: Avigdor Eldar, Jerusalem (IL)

(73) Assignee: Intel Corporaton, Santa Clara, CA (US)

( * ) Notice: Subject to any disclaimer, the term of this patent is extended or adjusted under 35 U.S.C. 154(b) by 2920 days.

(21) Appl. No.: 11/021,568

(22) Filed: Dec. 22, 2004

(65) Prior Publication Data

US 2006/0133370 A1 Jun. 22, 2006

(51) Int. Cl.
*G06F 15/173* (2006.01)
(52) U.S. Cl.
USPC ......................................................... 709/250
(58) Field of Classification Search
USPC ......................................... 709/250; 370/389
See application file for complete search history.

(56) References Cited

U.S. PATENT DOCUMENTS

| 6,446,192 | B1 * | 9/2002 | Narasimhan et al. | 712/29 |
| 6,487,619 | B1 | 11/2002 | Takagi | |
| 6,601,101 | B1 * | 7/2003 | Lee et al. | 709/227 |
| 6,757,725 | B1 * | 6/2004 | Frantz et al. | 709/223 |
| 6,826,613 | B1 * | 11/2004 | Wang et al. | 709/227 |
| 6,941,386 | B2 * | 9/2005 | Craft et al. | 709/250 |
| 6,996,621 | B1 * | 2/2006 | Borella et al. | 709/228 |
| 7,316,014 | B2 * | 1/2008 | Cao | 717/169 |
| 7,328,284 | B2 * | 2/2008 | Rimmer | 709/250 |
| 7,337,241 | B2 * | 2/2008 | Boucher et al. | 709/250 |
| 2003/0185220 | A1 | 10/2003 | Valenci | |
| 2004/0078462 | A1 * | 4/2004 | Philbrick et al. | 709/224 |
| 2006/0075119 | A1 * | 4/2006 | Hussain et al. | 709/227 |

FOREIGN PATENT DOCUMENTS

WO WO-2006/069279 A2 6/2006

OTHER PUBLICATIONS

Office Action mailed Jun. 12, 2008 in the DE application, with partial English translation (4 pages total).*
Office Action mailed Oct. 1, 2007 in the DE application, with English translation (12 pages total).*
Notification of Transmittal of the International Preliminary Report on Patentability—PCT application PCT/US2005/046694 (7 pages total).*
"International Search Report for corresponding PCT Application No. PCT/US2005/046694", (Jan. 6, 2006),4 pgs.
Valero, M., et al., "Embedded Computing: New Directions in Architecture and Automation", *Proceedings of HIPC*, (2000), 225-224.
"German Application Serial No. 112005003217.5, Response filed Jan. 13, 2009 to Office Action mailed Jun. 12, 2008", w/English Translation, 26 pgs.
"German Application Serial No. 112005003217.5, Response filed May 23, 2008 to Office Action mailed Oct. 1, 2007", w/English Translation, 23 pgs.
"Taiwanese Application Serial No. 94145536, Office Action mailed Feb. 26, 2009", w/English Translation, 19 pgs.
"Taiwanese Application Serial No. 94145536, Response filed Jun. 15, 2009 to Office Action mailed Feb. 26, 2009", w/English Translation, 11 pgs.

* cited by examiner

*Primary Examiner* — Scott Christensen
(74) *Attorney, Agent, or Firm* — Schwegman, Lundberg & Woessner, P.A.

(57) ABSTRACT

A method to provide transfer of data without the use of a network from an application program to an embedded device. A routing service establishes a communication channel without the use of a local area network. The routing service then manages the control of this communication channel for the transfer of data and closes the channel in an appropriate period.

27 Claims, 6 Drawing Sheets

ROUTING OF MESSAGES

TECHNICAL FIELD

In general, the present subject pertains to communication systems and more particularly to application software control of an embedded unit.

BACKGROUND

Typically, third-party application software communicates through a local area network to an embedded processor for managing an embedded device controlled by the embedded processor. This application software will communicate through the local area network, utilizing standard protocol such as: HTTP (hyper text transport protocol), SOAP (standard protocol enabling remote procedure calls) messages, and TLS/SSL (transport layer security/secure socket layer).

Further, some of the services provided by application software may execute on the same computational platform for which manageability of the embedded device is sought. For example, a management console may gather inventory information from all computational platforms in an organization. This inventory information may be gathered from the embedded manageability devices residing on an organization's computational platforms. As an additional example, the information may be located in some type of non-volatile memory. The application software may need to gather such information located within the control of the embedded device to provide, for example, information sharing between local and remote agents.

Simply returning information to the application software through a local device using normal network stacks will result in the information being forwarded incorrectly. Either the TCP/IP (transmission control protocol/internet protocol) stack may not forward the information to a network adapter or the network will not return data packets back on the same physical link from which they came.

DETAILED DESCRIPTION

Figure 1:
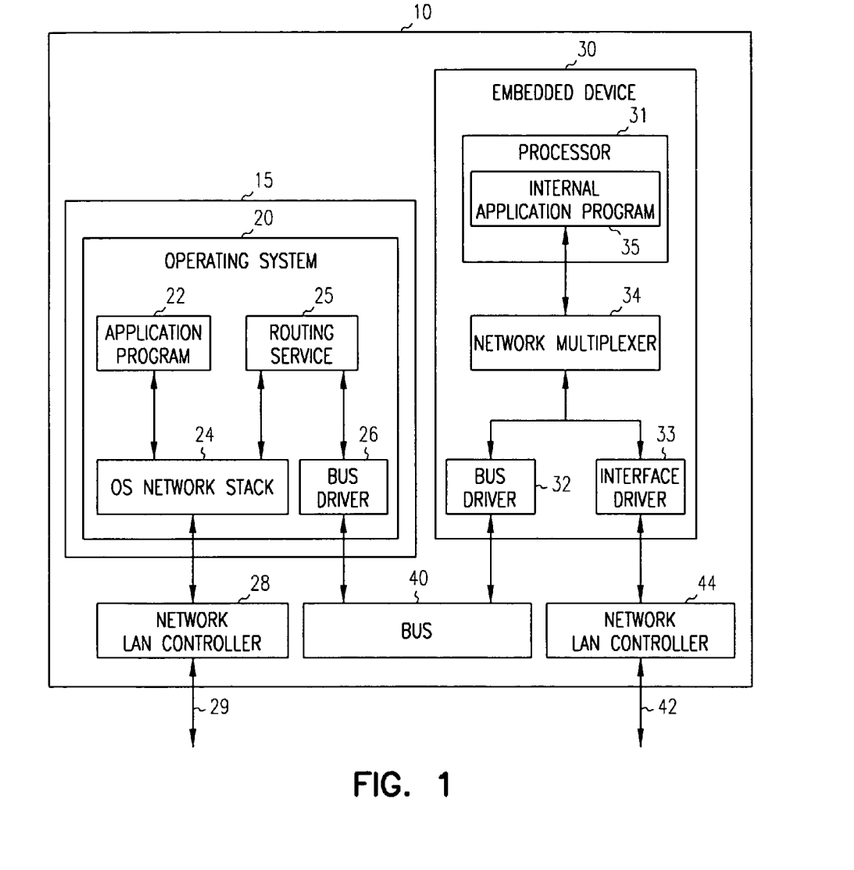
FIG. 1 is a block diagram of a communication arrangement in accordance with an embodiment in the present invention.

FIG. 1 is a block diagram of a communication arrangement directly between operating system 20 of processor 15 and embedded device 30 without using a local area network in accordance with an embodiment of the present invention. This communication arrangement can enable an application program 22 to provide out-of-band (OOB) management of the communication arrangement. OOB indicates that a system may be an operating system agnostic. Typically, application programs communicate through a network utilizing standard protocols. As an example of such an arrangement, consider a management console of computational platform 10 gathering inventory information from various computational platforms in an organization. This information may need to be gathered from embedded manageability devices (commonly referred to as embedded devices). However, simply sending the information to the embedded device through a normal network stack will result in information being incorrectly forwarded.

Operating system 20 may be associated with the application program 22. Application program 22 is coupled to the operating system (OS) network stack 24. Although application program 22 is shown within the OS 20, program 22 may be separate from the OS 20. Typical flow of messages through operating system 20 is from OS network stack 24 to network LAN controller 28 and via routing 29 to a local area network (not shown).

Incoming messages for embedded device 30 are received from the local area network (not shown) through routing 42 to a network LAN controller 44. Upon the initialization of operating system 20, routing service 25 is bound to OS network stack 24 via a particular destination port.

When application program 22 uses the particular destination port number, which is an internet assigned number authority (IANA) transmission control protocol/internet protocol (TCP/IP) port number, routing service 25 binds to this particular port number. Once this binding is completed, any messages sent to the OS network stack 24 with destination IP address assigned to OS 20 and with the particular destination port number would be routed by OS network stack 24 to routing service 25.

When application program 22 communicates with an embedded device 30, it sends a message using standard network protocols to OS network stack 24. OS network stack 24 may check the destination IP address and TCP destination port associated with the message. OS network stack 24 then identifies the message as either one which should be routed to an entity or one which should be routed to the routing service 25.

An embedded device in some embodiments may be a device that is placed within a computational platform. The embedded device may include a set of resources independent of the main resources of the computational platform, such as, a processor and a memory resources, for example.

Normally messages would be transmitted from OS network stack 24 through network LAN controller 28 and routed via network routing 29 to the network.

In the present example, OS network stack 24 has determined from the destination IP address and the TCP destination port that routing of the message should be to routing service 25, for example.

Routing service 25 may then send a connect message through bus driver 26 through bus 40 to the embedded device 30. Bus arrangement 40 may include a serial bus, a parallel bus, a PCI bus, a buffer, a switch, a memory of various types, or a number of registers.

Bus 40 then passes the message through interface driver 33 of embedded device 30 through network multiplex 34 to internal application program 35 of embedded device 30. If the message is a connect message, for example, the connect request may be successful.

Once this communication channel becomes established from routing service 25 to internal application program 35, the message originally sent by application program 22 through OS network stack 24 to routing service 25 is transmitted along the same communication channel as previously mentioned to internal application program 35. This communication channel is from routing service 25, through bus driver 26, through bus 40, through interface driver 33, through network multiplexer 34 to internal application program 35.

When all the messages have been sent by routing service 25, or received by routing service 25, routing service 25 will then close one side of the communication channel that was previously established after receiving a close request from application program 35, for example. That is, routing service 25 will tear down the connection between bus driver 26 and bus 40, and between bus 40 and interface driver 33.

In addition, embedded device 30 may receive input from the network via routing 42 through local area network (LAN) controller 44. Such network routed messages are then sent to interface driver 33, through network multiplexer 34 to the internal application program 35. Further, embedded device 30 may include an embedded processor 31 or other devices. The embedded device may provide for execution of the internal application program 35. Embedded processor 31 may be implemented on a chip-set, in an embodiment. In other embodiment, embedded processor 31 as well as embedded device 30 may be implemented as part of a chip set, on a mother board as a chip, or on a portion of a network interface card (NIC) inserted into a circuit card slot. However, the implementation is not limited to these configurations. A chip is a semiconductor device.

Bus 40 transmits messages between routing service 25 and internal application program 35 and may be implemented on top of a peripheral controller interface such as PCI/PCI-X/PCI-Express, USB, etc. type bus arrangement. Further, store and forward devices such as memories, etc. may provide the communication channel as well.

Operating system 20 may be implemented on a semiconductor device fabricated by various technologies known to those of ordinary skill in the art such as silicon, gallium arsenate, etc. This semiconductor device or "chip" may include a processor 15 having an operating system 20, an application program 22, OS network stack 24, routing service 25 and bus driver 26.

Figure 2:
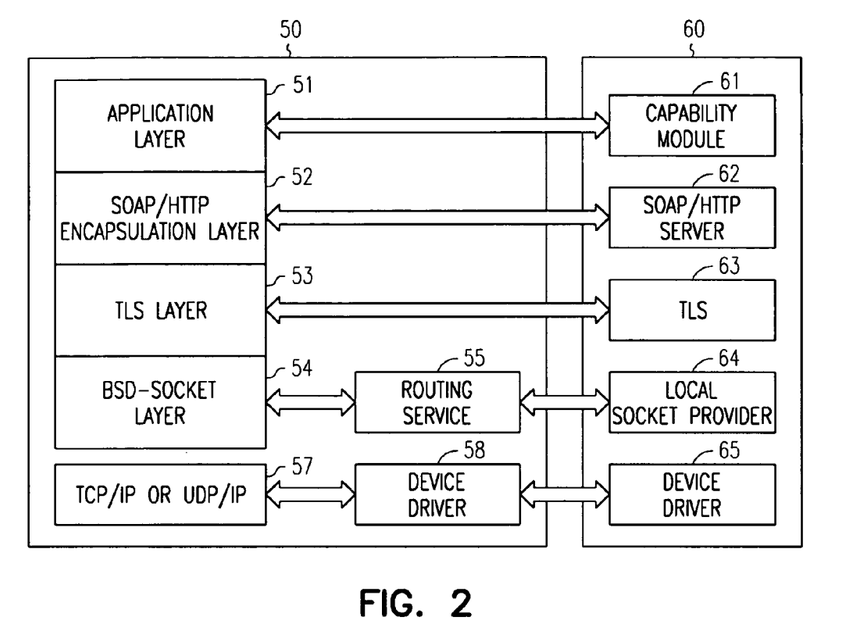
FIG. 2 is a block diagram depicting various protocol layers associated with an embodiment of the present invention.

FIG. 2 is a block diagram which maps various network protocol layers which may be used to communicate with software which handles each layer. The various protocols of 50 correspond to the protocol layers associated with operating system 20. The various protocols of 60 correspond to the protocols associated with embedded device 30. The highest level protocol within writing system protocols is the application layer 51. On the highest level of protocol stack 60 of the embedded device 30 is capability module (CM) 61 which provides the highest level protocol layer. The application layer communicates and corresponds with the capability module level 61 in the embedded device protocol stack 60.

The next lower layer within the protocol stack 50 of operating system 20 is SOAP/HTTP encapsulation layer 52. This layer corresponds and communicates with SOAP/HTTP server 62 in the embedded device protocol stack 60.

The next lower layer in the operating system stack 50 is the transport layer security (TLS) layer 53. The transport layer security 53 communicates with and corresponds to transport layer security (TLS) 63 within the embedded device protocol stack 60.

The next lower layer of the protocol stack 50 of the operating system is a BSD socket layer 54. The BSD socket layer 54 communicates with and corresponds to local socket provider 64 through routing service protocol 55. Routing service protocol 55 communicates with BSD socket layer 54. Routing service protocol 55 communicates with the local socket provider protocol 64 of the embedded device protocol stack 60.

Lastly is shown the transmission control protocol/internet protocol (TCP/IP) or user datagram protocol/internet protocol 57. Device driver protocol 58 communicates between device driver 65 of the protocol stack 60 of embedded device 30 and the transmission control protocol/internet protocol (TCP/IP) or user datagram protocol/internet protocol 57.

As a result of the above-described processing by routing service 25, it can be seen that a data transfer is shown excluding the use of a local area network.

Figure 3:
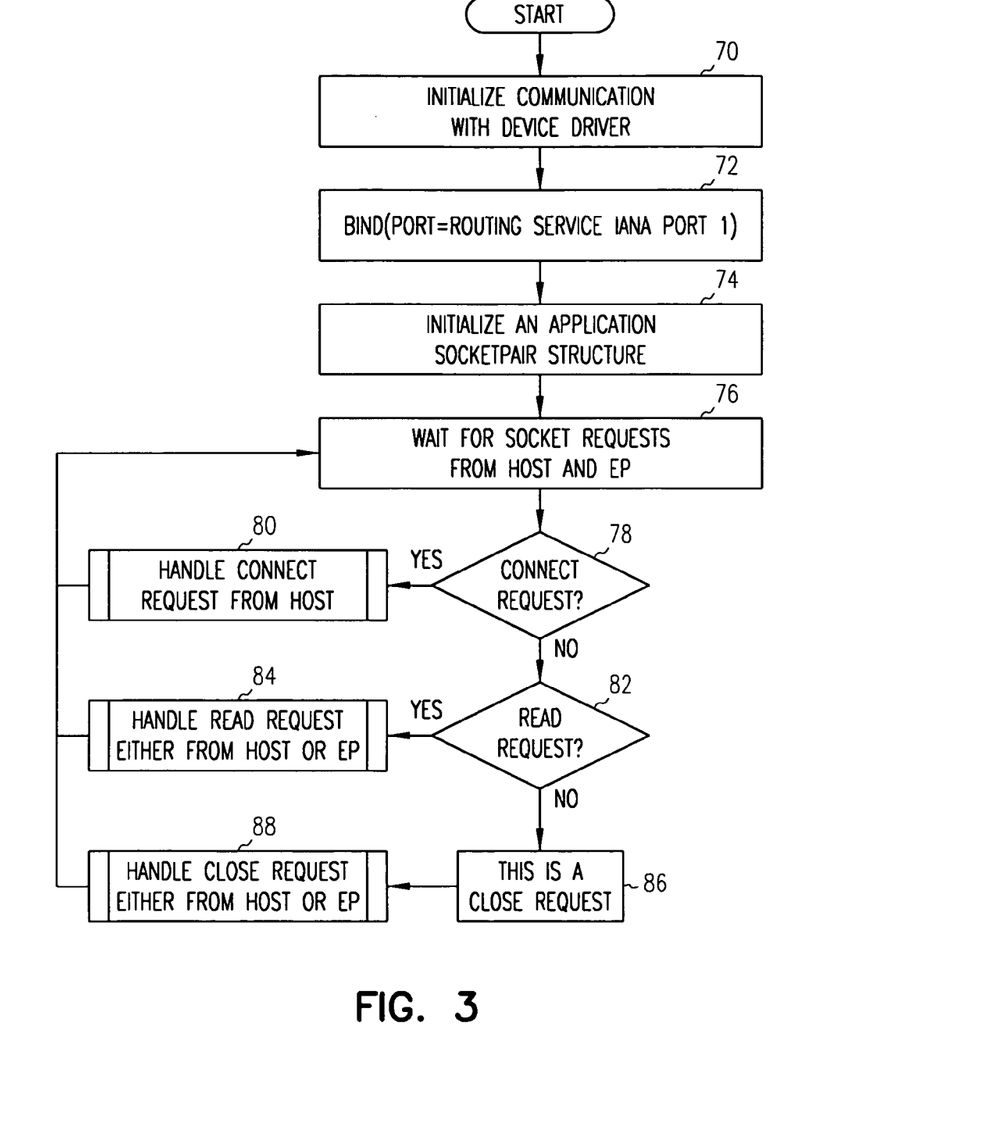
FIG. 3 is a flow chart of a communication arrangement in accordance with an embodiment of the present invention.

In FIG. 3, a flow chart of an embodiment of the method for routing is shown. This method is performed by routing service 25. The implementation for the processing described herein may take the form of machine-readable software code. This machine-readable software code might be implemented in read-only memory, any non-volatile random access memory, flash memory, electronically programmable read-only memory, etc.

The method for routing of data is started and block 70 is entered. First, the routing service 25 initializes communication with device or bus driver 26, block 70. Next, routing service 25 binds to the port associated with the TCP destination, block 72. The routing service 25 is typically bound to a particular designated TCP port when the computational platform 10 is initially started or is restarted. This IANA port couples OS network stack 24 to routing service 25.

Next, routing service 25 initializes an application socket pair, block 74. That is, routing service 25 establishes the BSD socket layer from 54 to 55 and a pseudo-socket from 55 to 64. Then routing service 25 awaits the socket requests coming from the socket layer 54 of operating system 20 and the local socket provider 64 of embedded device 30.

When these socket requests are received by routing service 25, the appropriate connection between bus drivers 26 and 32 have been selected and established.

The service 55 then waits for responses from the socket requests at block 76. When a single socket request has been received, block 76 transfers control to block 78. Block 78 determines whether the request may be a connect request to establish the communication channel from routing service 25 through bus driver 26 through bus arrangement 40, through bus driver 32 and network multiplexer 34 to internal application program 35. If the request is a connect request, block 78 transfers control to block 80 via the YES path. Block 80, which will be explained in detail later, handles the connect request from routing service 25 and host processor 15 and then transfers control, upon completion, to block 76 to wait for subsequent socket requests.

If the request is not a connect request, block 78 transfers control to block 82 via the NO path. Block 82 determines whether the request may be a read request for exchanging data between internal application program 35 and routing service 25. If the request is a read request, block 82 transfers control to block 84 via the YES path. Block 84 handles the read request from either the application program 22 of the operating system (HOST) or the internal application program 35 of the imbedded device (EP). When the read request is completed, block 84 transfers control to block 76 to wait for socket requests.

If the request is determined to be neither a connect or read request, block 82 transfers control to block 86 via the NO path. This method determines that the request should be a close request. That is, the close request is the command to tear down the previously established communication channel from routing service 25 to internal application program 35 or communication channel from application program 22 to routing service 25, depending on the source of this request (HOST or EP). Since this is a close request, block 86 transfers control to block 88. Block 88 handles the close request from either the routing service of the operating system or the internal application program of the imbedded device. Upon completion of the close, block 88 transfers control to block 76 to wait for socket requests. As a result of the above-described processing, it can be seen that a data transfer is shown excluding the use of a local area network.

Figure 4:
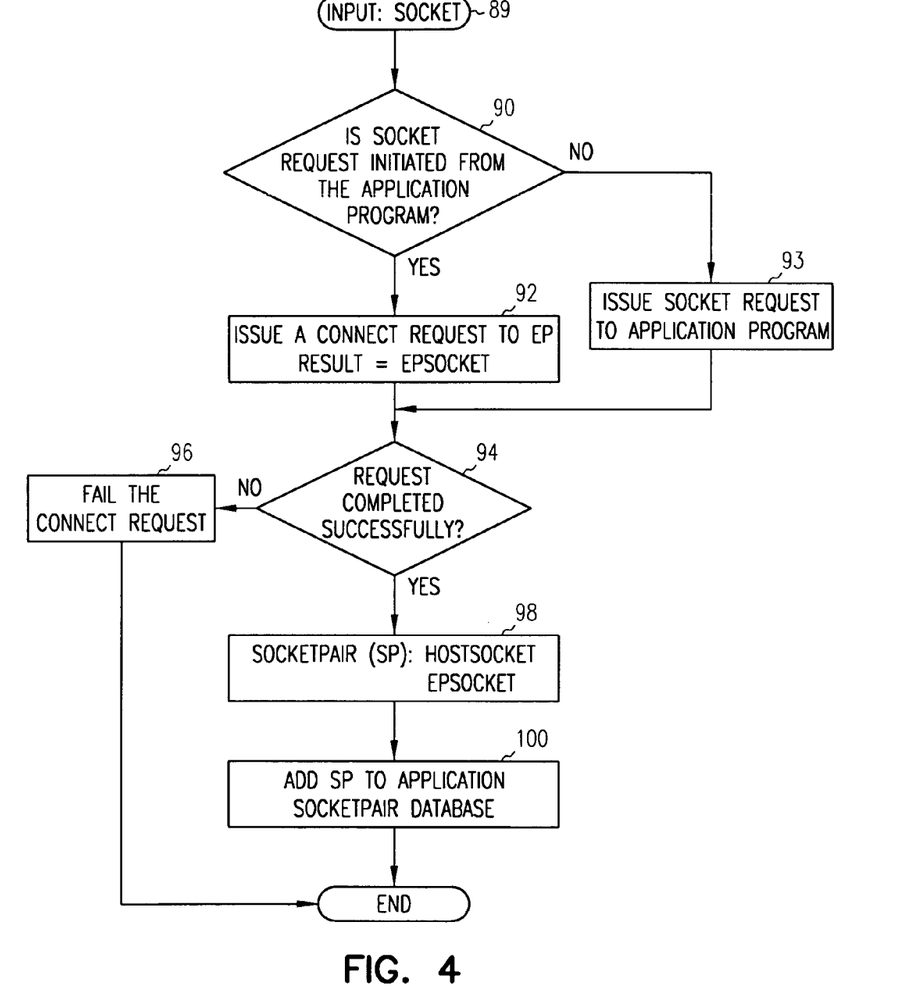
FIG. 4 is a flow chart of a connect request in accordance with an embodiment of the present invention.

In FIG. 4, a flow chart of an embodiment of the connect request processing of block 80 is shown. Block 89 diagrammatically depicts the input to the connect request 80 as being the socket identity. Block 90 then determines the socket request is initiated from the application 22. Recall that the application program 22 is typically the one which can request the connection of the communication channel between the operating system and the embedded device, although the embedded 30 may also request. If the socket request is not initiated from the application 22, block 90 transfers control via the NO path to block 93. Block 93 issues a socket request to the application. Then block 93 transfers control to block 94.

If the connect request is from the application 22, block 90 transfers control to block 92 via the YES path. Next, block 92 issues a connect request to the embedded device, resulting in embedded processor socket.

Next, block 94 waits and determines whether the connect request has been successfully completed. If the request does not complete within a predetermined time limit or is returned as being incomplete, block 94 transfers control to block 96. Block 96 indicates a failure of the connect request and ends the process.

When the connect request is successfully complete, block 94 transfers control to block 98 via the YES path. Then a socket pair (SP) is determined: HOST processor 15 and embedded processor 31. Then the socket pair for the application program 22 to internal application 35 connection is stored in a data base by routing service 25. The process is ended.

Figure 5:
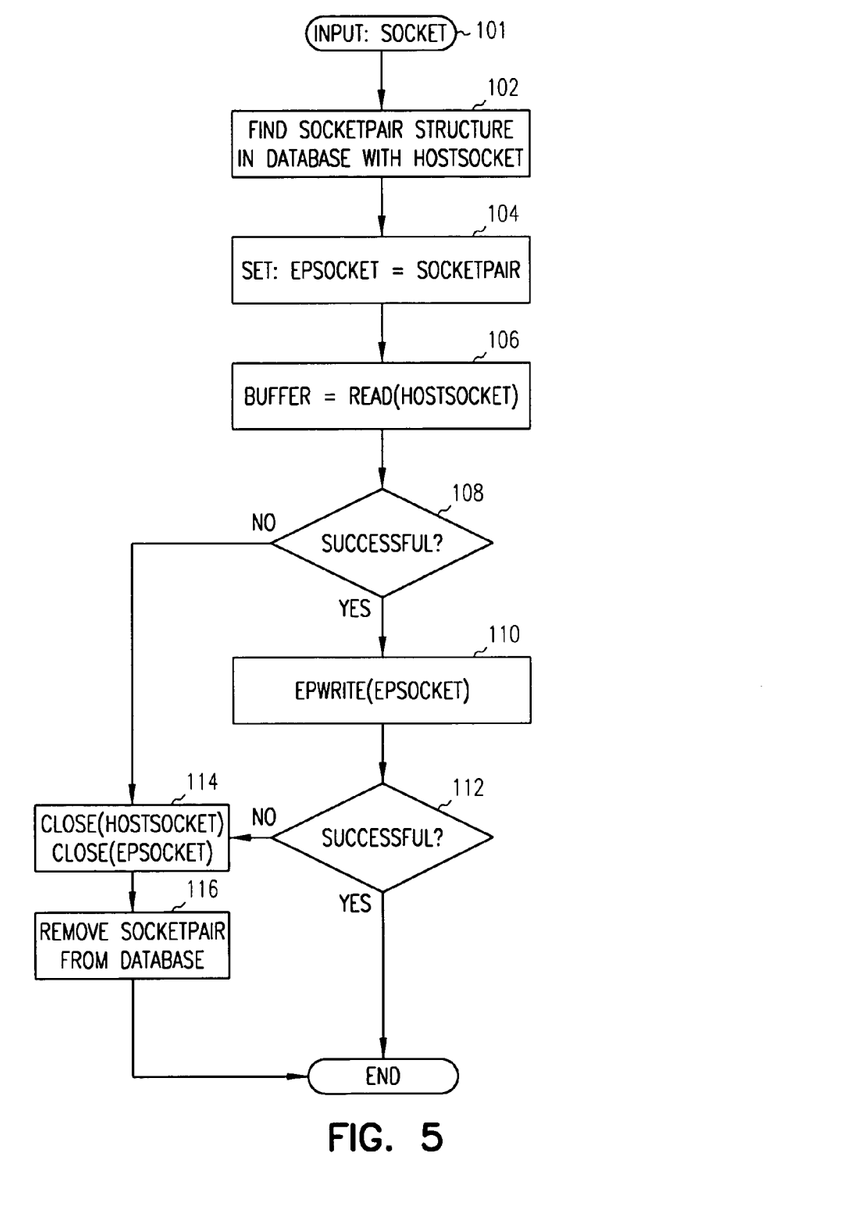
FIG. 5 is a flow chart of a read request in accordance with an embodiment of the present invention.

In FIG. 5, an embodiment of the read request 84 from either the operating system or embedded device is depicted in flow chart form. The input to the read request is the socket identity, block 101.

First, the socket pair structure is found from a data base indicating the host socket, block 102. Next, routing service 25 sets the socket of the embedded device (EP) with the socket pair of the data base, block 104.

Next, block 106 sets a read/write buffer to read from the HOST socket. This assumes that the message is being transferred from the application program 22 to the internal application program 35. If the data transfer happened to be from internal application program 35 to application program 22, the buffer read would be from the embedded device 30.

Next, block 108 determines whether this request to read into the buffer was successful. If the buffer request was successful, block 108 transfers control to block 110 via the YES path. Block 110 then writes the data. This corresponds to sending the data from the buffer through bus driver 26, through bus arrangement 40, through bus driver 32 and network multiplexer 34 to the internal application program 35 (EP). If the data transfer is from internal application program 35 to application program 22, the data flow and reading and writing would be performed by the other socket of the socket pair (HOST). If the write is successful, the data is received by internal application program 35, block 112 transfers control and ends the process.

If the attempted write was unsuccessful, block 112 transfers control to block 114 via the NO path. Block 114 first closes the operating system socket, the initiator of the data request. Then block 114 closes the embedded device socket, the receiver of the data transfer request.

Then the socket pair is removed from the data base, block 116. The process is then ended.

Similarly, for an unsuccessful read to the buffer, block 108 transfers control to block 114. Block 114 and block 116 perform as mentioned above. Then the process is ended.

Figure 6:
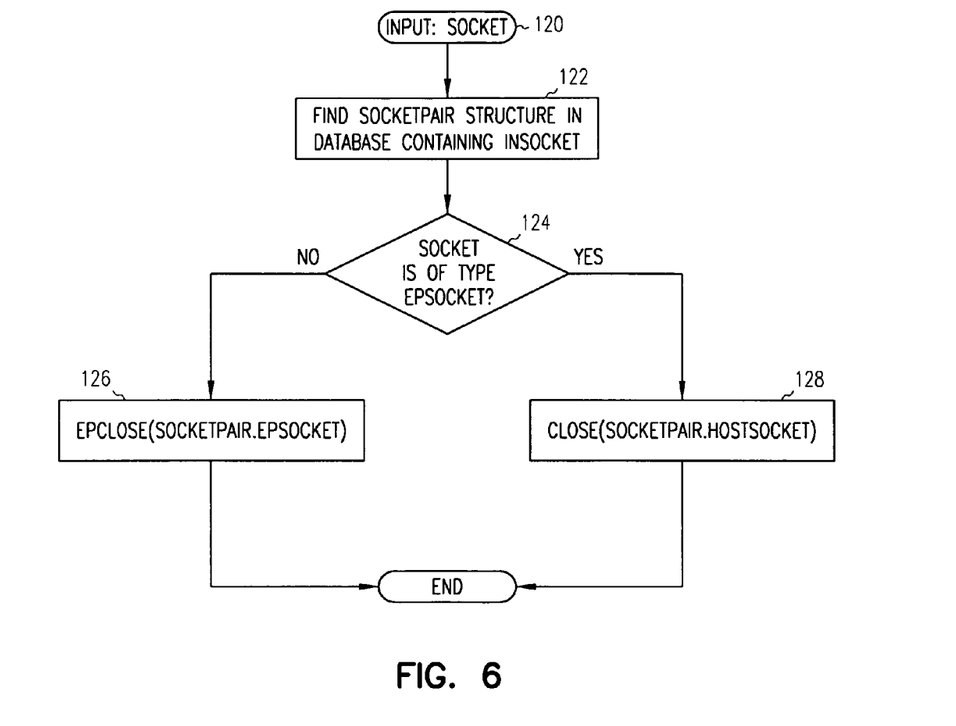
FIG. 6 is a flow chart of a close request in accordance with an embodiment of the present invention.

In FIG. 6, an embodiment of the close request 88 is depicted in flow chart form. Block 120 indicates the input being the socket identity. Next, the socket pair structure is found in the data base from the socket identity, block 122. Next, block 124 determines whether the socket identity is a type of embedded device socket (EP). If it is an embedded device, block 124 transfers control to block 128 via the YES path. Block 128 closes the socket pair from the HOST socket. Then the process is ended.

If the socket type is not an embedded device socket, block 124 transfers control to block 126 via the NO path. In block 126, the embedded device closes the socket pair from the embedded device socket (EP). Then the process is ended.

The description and the drawings illustrate specific embodiments of the invention sufficiently to enable those skilled in the art to practice it. Examples merely typify possible variations. Portions and features of some embodiments may be included in or substituted for those of others. The scope of the embodiments of the invention encompasses the full ambit of the claims and all available equivalents. In some embodiments, the present invention relates to communicating by an application program with an embedded device or processor. In other embodiments, the present invention may pertain to communication between an application program 22 and an embedded device 30 without the use of any local area network 28-29, 42-44.

As a result of the above-described processing by routing service 25, it can be seen that a data transfer is shown excluding the use of a local area network. Further, routing service 25 may be implemented on a semiconductor device. This avoids further costs of "add-on" hardware.

Although some embodiments of the invention have been illustrated, and those forms described in detail, it will be readily apparent to those skilled in the art that various modifications may be made therein without departing from the spirit of these embodiments or from the scope of the appended claims.

The invention claimed is:

1. A method comprising:
    determining to route one or more messages of an application program to an embedded device;
    initializing communication with the embedded device including binding a routing service to an operating system network stack via a particular Transmission Control Protocol (TCP) destination port, the operating system network stack coupled to the application program;
    intercepting at the operating system network stack any of the one or more messages received at the operating system network stack that include a destination IP address assigned to the operating system network stack and a designation of the particular TCP destination port;
    initializing an application socket pair including a socket layer in the operating system network stack coupled through the routing service to a local socket provider in the embedded device; and
    sending the intercepted messages through the routing service from the socket layer to the embedded device after the message is intercepted by the operating system network stack, the routing service excluding use of a local area network.

2. The method of claim 1, wherein sending the intercepted messages through the routing service includes sending the one or more messages via a bus to the embedded device.

3. The method of claim 2, wherein the sending the one or more messages via the bus to the embedded device includes sending the one or more messages via a bus driver to the bus.

4. The method of claim 2, wherein the sending the one or more messages via the bus to the embedded device includes sending the one or more messages from the bus via a bus driver to the embedded device.

5. The method of claim 4, wherein the sending the one or more messages via the bus driver to the embedded device includes sending the one or more messages from the bus driver via a multiplexer to the embedded device.

6. The method of claim 1, wherein sending the intercepted messages through the routing service includes opening a communication channel between the routing service and the embedded device.

7. The method of claim 6, wherein sending the intercepted messages through the routing service includes sending data between the routing service and the embedded device when the communication channel is connected.

8. The method of claim 7, wherein sending the intercepted messages through the routing service includes closing the communication channel when communication is completed.

9. The method of claim 1, wherein intercepting the one or more messages to the embedded device includes determining by the operating system network stack that the one or more messages indicates a local address.

10. The method of claim 9, wherein determining by the operating system network stack that the one or more messages indicates a local address includes examining a destination internet protocol (IP) address.

11. A router comprising:
an embedded device to receive one or more messages from an application program;
a routing service operable to bind to an operating system network stack via a particular Transmission Control Protocol (TCP) destination port, and to initialize an application socket pair coupling a socket layer in the operating system network stack through the routing service to a local socket provider in the embedded device;
the operating system network stack operable to intercept any of the one or more messages received at the operating system network stack that include a destination IP address assigned to the operating system network stack and a designation of the particular TCP destination port; and
the routing service operable to send the intercepted messages to the embedded device without use of a local area network.

12. The router as claimed in claim 11, including a bus coupled to the routing service and to the embedded device, the bus to send the one or more messages from the routing service to the embedded device.

13. The router as claimed in claim 12, further including a bus driver coupled between the bus and the routing service.

14. The router as claimed in claim 12, the embedded device including a bus driver coupled to the bus.

15. The router as claimed in claim 14, the embedded device further including a multiplexer coupled to the bus driver.

16. The router as claimed in claim 14, the embedded device further including an internal application program coupled to the multiplexer.

17. A storage device storing computer executable instructions, which when executed by one or more processors, cause the processors to perform operations comprising:
determining to route one or more messages of an application program to an embedded device;
initializing communication with the embedded device including binding a routing service to an operating system network stack via a particular Transmission Control Protocol (TCP) destination port, the operating system network stack coupled to the application program;
intercepting at the operating system network stack any of the one or more messages received at the operating system network stack that include a destination IP address assigned to the operating system network stack and a designation of the particular TCP destination port;
initializing an application socket pair including a socket layer in the operating system network stack coupled through the routing service to a local socket provider in the embedded device; and
sending the intercepted messages through the routing service from the socket layer to the embedded device after the message is intercepted by the operating system network stack, the routing service excluding use of a local area network.

18. The storage media of claim 17, wherein sending the intercepted messages through the routing service includes sending the one or more messages via a bus to the embedded device.

19. The storage media of claim 17, wherein sending the intercepted messages through the routing service includes opening a communication channel between the routing service and the embedded device.

20. The storage media of claim 19, wherein sending the intercepted messages through the routing service includes sending data between the routing service and the embedded device when the communication channel is connected.

21. The storage media of claim 20, wherein sending the intercepted messages through the routing service includes closing the communication channel when communication is completed.

22. A system comprising:
an application program to send one or more messages to an embedded processor;
a routing service operable to bind to a operating system network stack via a particular Transmission Control Protocol (TCP) destination port, and to initialize an application socket pair coupling a socket layer in the operating system network stack through the routing service to a local socket provider in the embedded device;
the operating system network stack operable to intercept any of the one or more messages received at the operating system network stack that include a destination IP address assigned to the operating system network stack and a designation of the particular TCP destination port, the routing service operable to send the intercepted messages to the embedded processor excluding use of a local area network; and
the embedded processor, wherein the embedded processor is a portion of a network interface card, the network interface card being inserted into a circuit card slot.

23. The system as claimed in claim 22, wherein a parallel bus is a local bus coupled to the routing service and to the embedded device.

24. The system as claimed in claim 23, including:
a first bus driver coupled between the local bus and the routing service;
the embedded device includes a second bus driver coupled to the local bus;
the embedded device further includes a multiplexer coupled to the second bus driver; and the embedded device further includes an internal application program coupled to the multiplexer.

25. A semiconductor device comprising:

a semiconductor chip including a processor, the processor including an application program, an operating system network stack, and a routing service;

the routing service operable to bind to the operating system network stack via a particular Transmission Control Protocol (TCP) destination port, and to initialize an application socket pair coupling a socket layer in the operating system network stack through the routing service to a local socket provider in the embedded device;

the operating system network stack operable to intercept any messages sent from the application program and received at the operating system network stack that include a destination IP address assigned to the operating system network stack and a designation of the particular TCP destination port; and the routing service operable to send the intercepted messages to an embedded device without use of a local area network.

26. The semiconductor device as claimed in claim 25, the application program operable to generate a message to be communicated to the embedded device, the application program being coupled to the operating system network stack.

27. The semiconductor device as claimed in claim 25, the processor further including a bus driver to route the message to the embedded device, the bus driver being coupled to the routing service.

* * * * *

UNITED STATES PATENT AND TRADEMARK OFFICE
CERTIFICATE OF CORRECTION

| | | |
|---|---|---|
| PATENT NO. | : 8,645,578 B2 | Page 1 of 1 |
| APPLICATION NO. | : 11/021568 | |
| DATED | : February 4, 2014 | |
| INVENTOR(S) | : Avigdor Eldar | |

It is certified that error appears in the above-identified patent and that said Letters Patent is hereby corrected as shown below:

In the Claims

In column 7, line 4, in Claim 3, after "wherein", delete "the", therefor

In column 7, line 7, in Claim 4, after "wherein", delete "the", therefor

In column 7, line 11, in Claim 5, after "wherein", delete "the", therefor

Signed and Sealed this
Twenty-second Day of September, 2015

Michelle K. Lee
*Director of the United States Patent and Trademark Office*